US011133992B2

(12) United States Patent
Guha et al.

(10) Patent No.: US 11,133,992 B2
(45) Date of Patent: Sep. 28, 2021

(54) DETECTION AND NOTIFICATION OF ANOMALIES IN SHARED COMPUTER NETWORKS

(71) Applicant: ServiceNow, Inc., Santa Clara, CA (US)

(72) Inventors: Rahul Guha, Milpitas, CA (US); Kavita Waldia, San Jose, CA (US); Ankur Jain, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 89 days.

(21) Appl. No.: 16/403,048

(22) Filed: May 3, 2019

(65) Prior Publication Data
US 2020/0351178 A1    Nov. 5, 2020

(51) Int. Cl.
*H04L 12/24* (2006.01)
*H04L 12/911* (2013.01)
*H04L 12/26* (2006.01)

(52) U.S. Cl.
CPC ........ *H04L 41/5012* (2013.01); *H04L 41/046* (2013.01); *H04L 41/0866* (2013.01); *H04L 41/12* (2013.01); *H04L 43/04* (2013.01); *H04L 43/065* (2013.01); *H04L 43/0817* (2013.01); *H04L 47/781* (2013.01); *H04L 47/822* (2013.01)

(58) Field of Classification Search
CPC .................................................. H04L 43/0876
USPC ....................................................... 709/223
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,609,122 B1 | 8/2003 | Ensor |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |

(Continued)

*Primary Examiner* — Moustafa M Meky
*Assistant Examiner* — Sm Z Islam
(74) *Attorney, Agent, or Firm* — Fletcher Yoder PC

(57) ABSTRACT

A computational instance of a remote network management platform may be dedicated to a managed network. The computational instance may include persistent storage that contains: (i) mappings between end-user networks, services available to the end-user networks, and allocation identifiers, (ii) mappings between end-user networks, computing resources allocated to the end-user networks, and resource identifiers, and (iii) mappings between the respective allocation identifiers and the respective resource identifiers. Using the mappings, the computational instance may able to (i) determine that a particular computing resource is exhibiting an anomaly, (ii) determine a resource identifier associated with the particular computing resource, (iii) determine a allocation identifier based on the resource identifier, (iv) determine a particular end-user network associated with the allocation identifier; and (v) provide, to the managed network, an indication that the particular end-user network is potentially impacted by the anomaly.

20 Claims, 12 Drawing Sheets

(56) References Cited

U.S. PATENT DOCUMENTS

| | | | |
|---|---|---|---|
| 7,212,621 B1 * | 5/2007 | Wallenius | H04M 3/4217 379/221.01 |
| 7,350,209 B2 | 3/2008 | Shum | |
| 7,392,300 B2 | 6/2008 | Anantharangachar | |
| 7,610,512 B2 | 10/2009 | Gerber | |
| 7,617,073 B2 | 11/2009 | Trinon | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,877,783 B1 | 1/2011 | Cline | |
| 7,890,802 B2 | 2/2011 | Gerber | |
| 7,925,981 B2 | 4/2011 | Pourheidari | |
| 7,930,396 B2 | 4/2011 | Trinon | |
| 7,945,860 B2 | 5/2011 | Vambenepene | |
| 7,966,398 B2 | 6/2011 | Wiles | |
| 8,051,164 B2 | 11/2011 | Peuter | |
| 8,151,261 B2 | 4/2012 | Sirota | |
| 8,224,683 B2 | 7/2012 | Manos | |
| 8,266,096 B2 | 9/2012 | Navarrete | |
| 8,402,127 B2 | 3/2013 | Solin | |
| 8,457,928 B2 | 6/2013 | Dang | |
| 8,478,569 B2 | 7/2013 | Scarpelli | |
| 8,554,750 B2 | 10/2013 | Rangarajan | |
| 8,612,408 B2 | 12/2013 | Trinon | |
| 8,646,093 B2 | 2/2014 | Myers | |
| 8,674,992 B2 | 3/2014 | Poston | |
| 8,743,121 B2 | 6/2014 | De Peuter | |
| 8,832,652 B2 | 9/2014 | Mueller | |
| 8,887,133 B2 | 11/2014 | Behnia | |
| 9,065,783 B2 | 6/2015 | Ding | |
| 9,098,322 B2 | 8/2015 | Apte | |
| 9,122,552 B2 | 9/2015 | Whitney | |
| 9,239,857 B2 | 1/2016 | Trinon | |
| 9,317,327 B2 | 4/2016 | Apte | |
| 9,363,252 B2 | 6/2016 | Mueeler | |
| 9,535,737 B2 | 1/2017 | Joy | |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 10,748,070 B2 * | 8/2020 | Rajagopalan | G06Q 10/00 |
| 2015/0033084 A1 * | 1/2015 | Sasturkar | G06F 16/24578 714/46 |
| 2016/0254957 A1 * | 9/2016 | Maes | H04L 41/0886 709/223 |
| 2016/0373473 A1 * | 12/2016 | Truong | G06Q 10/08 |

* cited by examiner

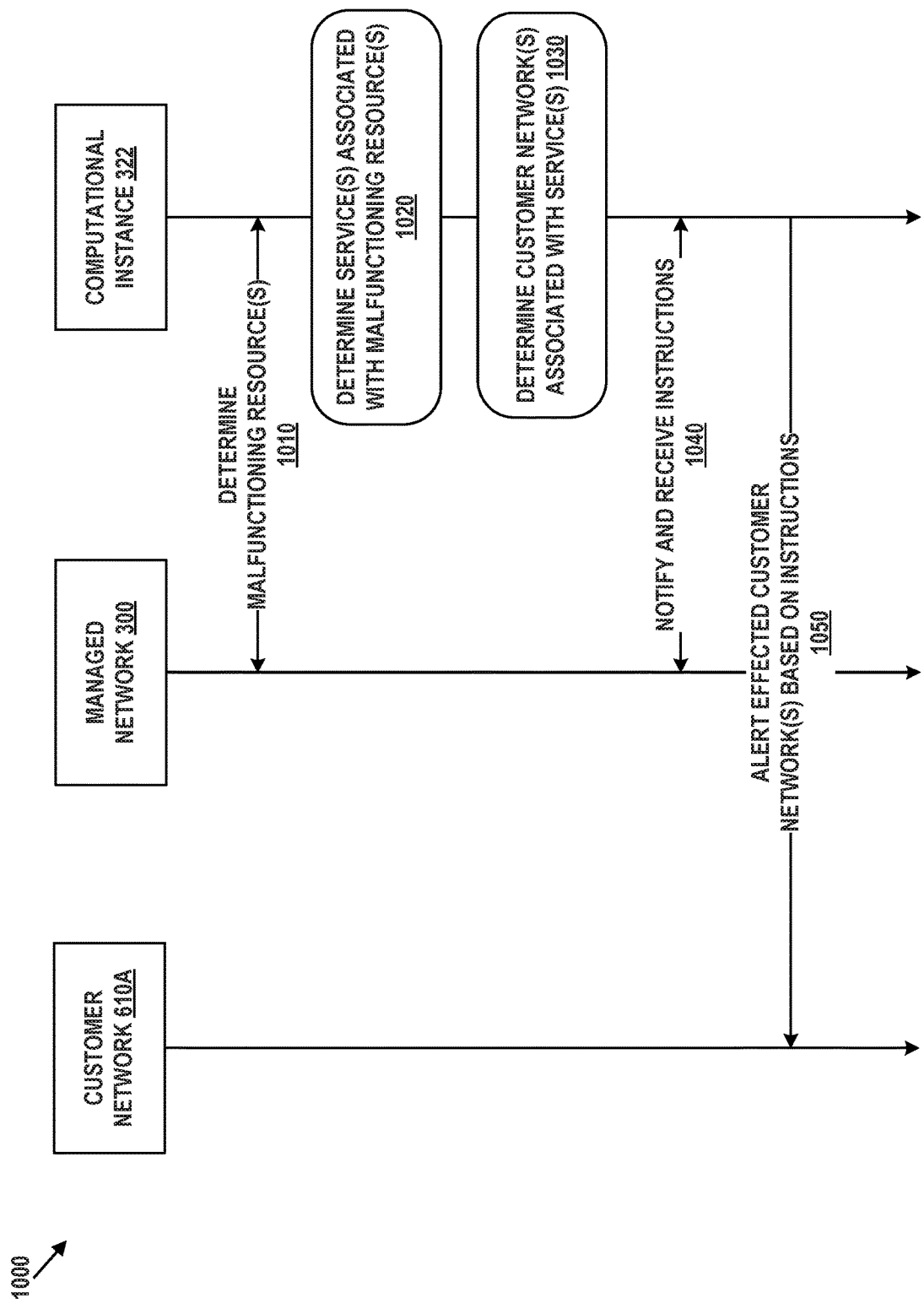

1100 — DETERMINE, BY ONE OR MORE PROCESSORS DISPOSED WITHIN A COMPUTATIONAL INSTANCE OF A REMOTE NETWORK MANAGEMENT PLATFORM, THAT A PARTICULAR COMPUTING RESOURCE IS EXHIBITING AN ANOMALY, WHEREIN THE COMPUTATIONAL INSTANCE IS DEDICATED TO A MANAGED NETWORK, WHEREIN THE COMPUTATIONAL INSTANCE INCLUDES PERSISTENT STORAGE, WHEREIN THE PERSISTENT STORAGE CONTAINS: (I) A FIRST SET OF MAPPINGS BETWEEN END-USER NETWORKS, SERVICES RESPECTIVELY AVAILABLE TO THE END-USER NETWORKS BY WAY OF THE MANAGED NETWORK, AND RESPECTIVE ALLOCATION IDENTIFIERS, (II) A SECOND SET OF MAPPINGS BETWEEN THE END-USER NETWORKS, COMPUTING RESOURCES RESPECTIVELY ALLOCATED TO THE END-USER NETWORKS BY THE MANAGED NETWORK, AND RESPECTIVE RESOURCE IDENTIFIERS, AND (III) A THIRD SET OF MAPPINGS BETWEEN THE RESPECTIVE ALLOCATION IDENTIFIERS AND THE RESPECTIVE RESOURCE IDENTIFIERS, WHEREIN EACH MAPPING OF THE THIRD SET OF MAPPINGS INDICATES THAT ONE OF THE SERVICES ASSOCIATED WITH ONE OF THE RESPECTIVE ALLOCATION IDENTIFIERS IS DEPLOYED UPON ONE OF THE COMPUTING RESOURCES ASSOCIATED WITH ONE OF THE RESPECTIVE RESOURCE IDENTIFIERS, AND WHEREIN THE PARTICULAR COMPUTING RESOURCE IS ONE OF THE COMPUTING RESOURCES

1110 — DETERMINE, BY THE ONE OR MORE PROCESSORS AND BASED ON THE SECOND SET OF MAPPINGS, A PARTICULAR RESOURCE IDENTIFIER ASSOCIATED WITH THE PARTICULAR COMPUTING RESOURCE

1120 — DETERMINE, BY THE ONE OR MORE PROCESSORS AND BASED ON THE THIRD SET OF MAPPINGS, A PARTICULAR ALLOCATION IDENTIFIER BASED ON THE PARTICULAR RESOURCE IDENTIFIER

1130 — DETERMINE, BY THE ONE OR MORE PROCESSORS AND BASED ON THE FIRST SET OF MAPPINGS, A PARTICULAR END-USER NETWORK ASSOCIATED WITH THE PARTICULAR ALLOCATION IDENTIFIER

1140 — PROVIDE, BY THE ONE OR MORE PROCESSORS AND TO THE MANAGED NETWORK, AN INDICATION THAT THE PARTICULAR END-USER NETWORK IS POTENTIALLY IMPACTED BY THE ANOMALY

FIG. 11

DETECTION AND NOTIFICATION OF ANOMALIES IN SHARED COMPUTER NETWORKS

BACKGROUND

A remote network management platform may administer some or all of the components of a managed network. In turn, the managed network may provide services to customers and/or customer networks. In one example, if the managed network is associated with a logistics enterprise, customers may include wholesale food distributors. In another example, if the managed network is associated with a healthcare management enterprise, customers may include hospitals or health clinics.

Typically, a managed network may offer a variety of services to support customer operations. Example services may include analytics, data storage, machine learning software, and so on. Customers may employ a single service or multiple services from the managed network. In some cases, the managed network may provide combinations of services to customers as unified offerings.

SUMMARY

To support the implementation of services, a managed network may maintain one or more computing resources (e.g., databases, virtual machines, containers, and/or other resources) that are associated with physical hardware. For example, if a managed network offers an analytics service, the operation of the analytics service may be carried out by the physical hardware of a computing resource on the managed network. Thus, a computing resource may be considered distinct from the services operating on the computing resource. In fact, a managed network may even offer computing resources as separate procurable items. Continuing from the above example, the managed network may allocate the analytics service to a customer and then may separately allocate a computing resource to the customer to operate the analytics service.

In practice, the computing resources maintained by a managed network may carry out the operations for various services. In some cases, the managed network may have hundreds, if not thousands of computing resources that carry out the operations of various services. Likewise, a customer may have services that operate across several computing resources maintained by the managed network.

As the amount of services offered by a managed network increases, it may be challenging to track complexities regarding (i) which customers are associated with which services and (ii) which services are operating on which computing resources on the managed network. Mismanaging these complexities can be detrimental not only for the managed network, but also for customers. For example, a customer may depend on a service that operates on a server cluster maintained by the managed network. If the server cluster fails, the customer's activities may be negatively impacted. And since the complexities may make it difficult for the managed network to identify customers affected by the server cluster failure, it may take days or even weeks to get the customer's operations fully restored and functioning.

The present disclosure provides an improvement to a remote network management platform that can address these and other issues. In particular, a remote network management platform may include a service model to capture the relationships between customers, services, and computing resources of a managed network. During operations, the service model can be populated with data to establish (i) which customers are associated with which services and (ii) which services are associated with which computing resources on the managed network. Advantageously, if a computing resource of the managed network fails, the services model can provide detailed support for addressing the particular services and/or customers affected by the failure.

The embodiments herein may provide numerous advantages. In one aspect, the present disclosure can be utilized by a managed network as a reactive tool to diagnose failures and their effects on customers. More specifically, by using the embodiments herein, a managed network may identify specific customers associated with a malfunctioning computing resource and may provide an informative, real time communication to those customers. In another aspect, the present disclosure can be utilized by a managed network as a proactive, diagnostic tool for upcoming infrastructure upgrades. More specifically, by using the embodiments herein a managed network may establish a dependency graph to identify particular customers that may be affected in the event of an erroneous infrastructure update (e.g., an update to computing resource gone awry). With this, the managed network may conduct infrastructure updates in a calculated fashion to mitigate potential damage to high value customers or preemptively notify affected customers before an infrastructure update. Other advantages and improvements are also possible and will be appreciated from the discussion herein.

Accordingly, a first example embodiment may involve persistent storage disposed within a computational instance of a remote network management platform, where the computational instance is dedicated to a managed network. The persistent storage may contain: (i) a first set of mappings between end-user networks, services respectively available to the end-user networks by way of the managed network, and respective allocation identifiers, (ii) a second set of mappings between the end-user networks, computing resources respectively allocated to the end-user networks by the managed network, and respective resource identifiers, and (iii) a third set of mappings between the respective allocation identifiers and the respective resource identifiers, wherein each mapping of the third set of mappings indicates that one of the services associated with one of the respective allocation identifiers is deployed upon one of the computing resources associated with one of the respective resource identifiers. The embodiment may also involve one or more processors disposed within the computational instance and configured to perform operations. The operations may include: determining that a particular computing resource of the computing resources is exhibiting an anomaly, determining, based on the second set of mappings, a particular resource identifier associated with the particular computing resource, determining, based on the third set of mappings, a particular allocation identifier based on the particular resource identifier, determining, based on the first set of mappings, a particular end-user network associated with the particular allocation identifier, and providing, to the managed network, an indication that the particular end-user network is potentially impacted by the anomaly.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 10 depicts a message flow diagram for service model diagnosis, in accordance with example embodiments.

FIG. 11 is a flow chart, in accordance with example embodiments.

DETAILED DESCRIPTION

Figure 1:
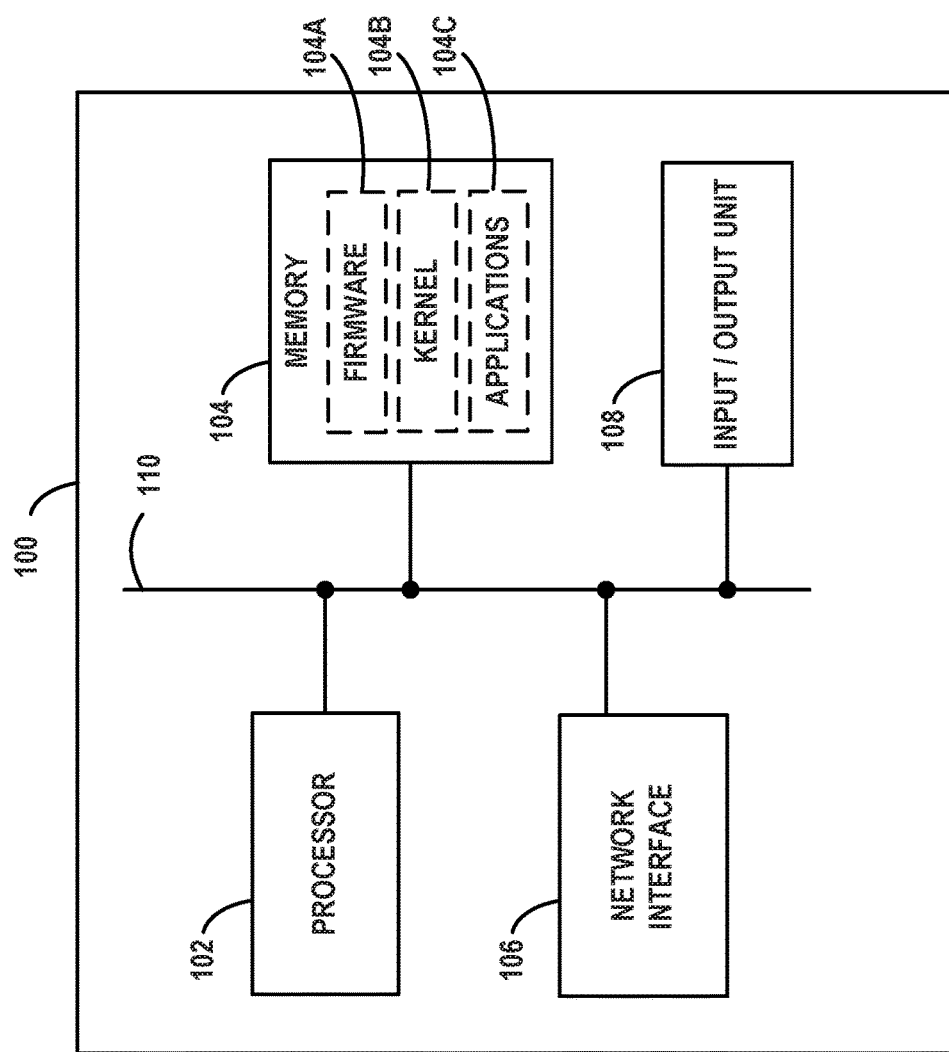
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
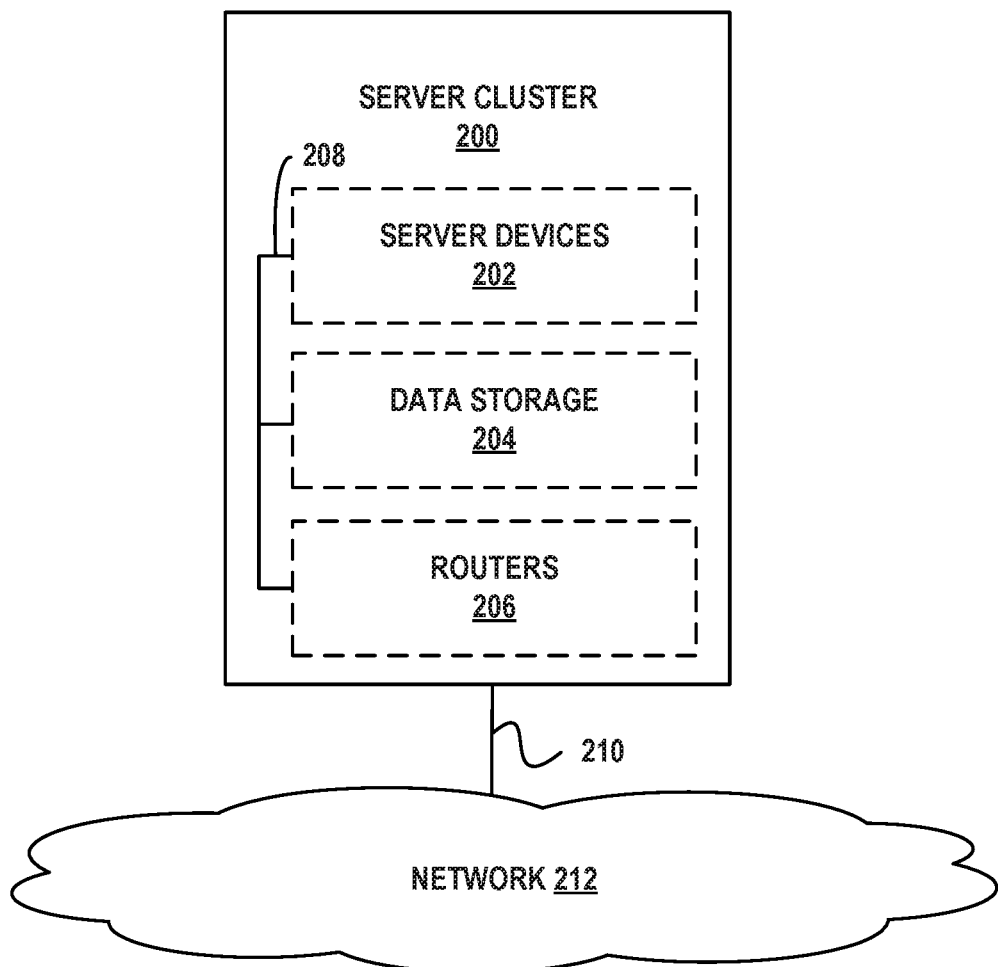
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. Example Remote Network Management Architecture

Figure 3:
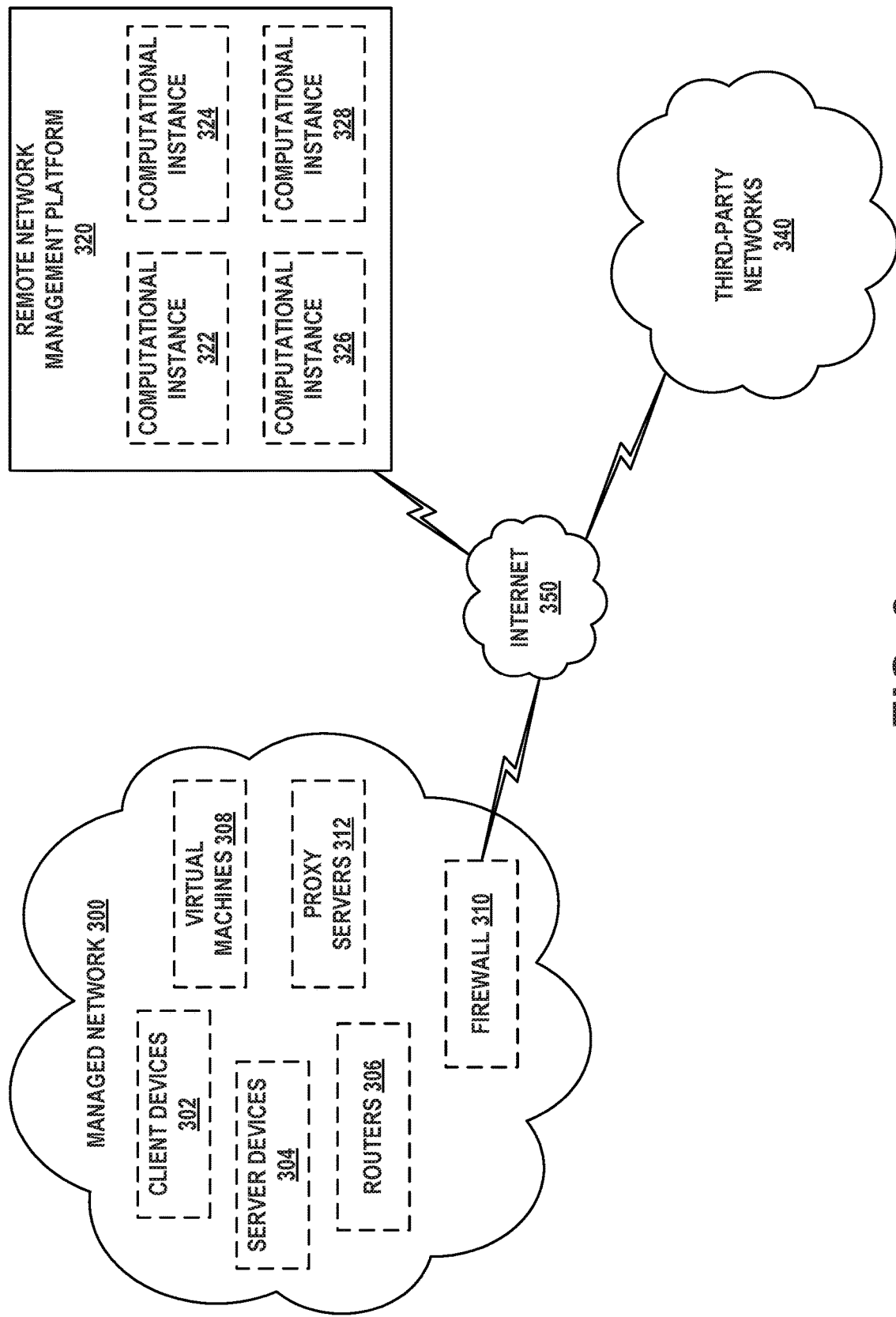
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
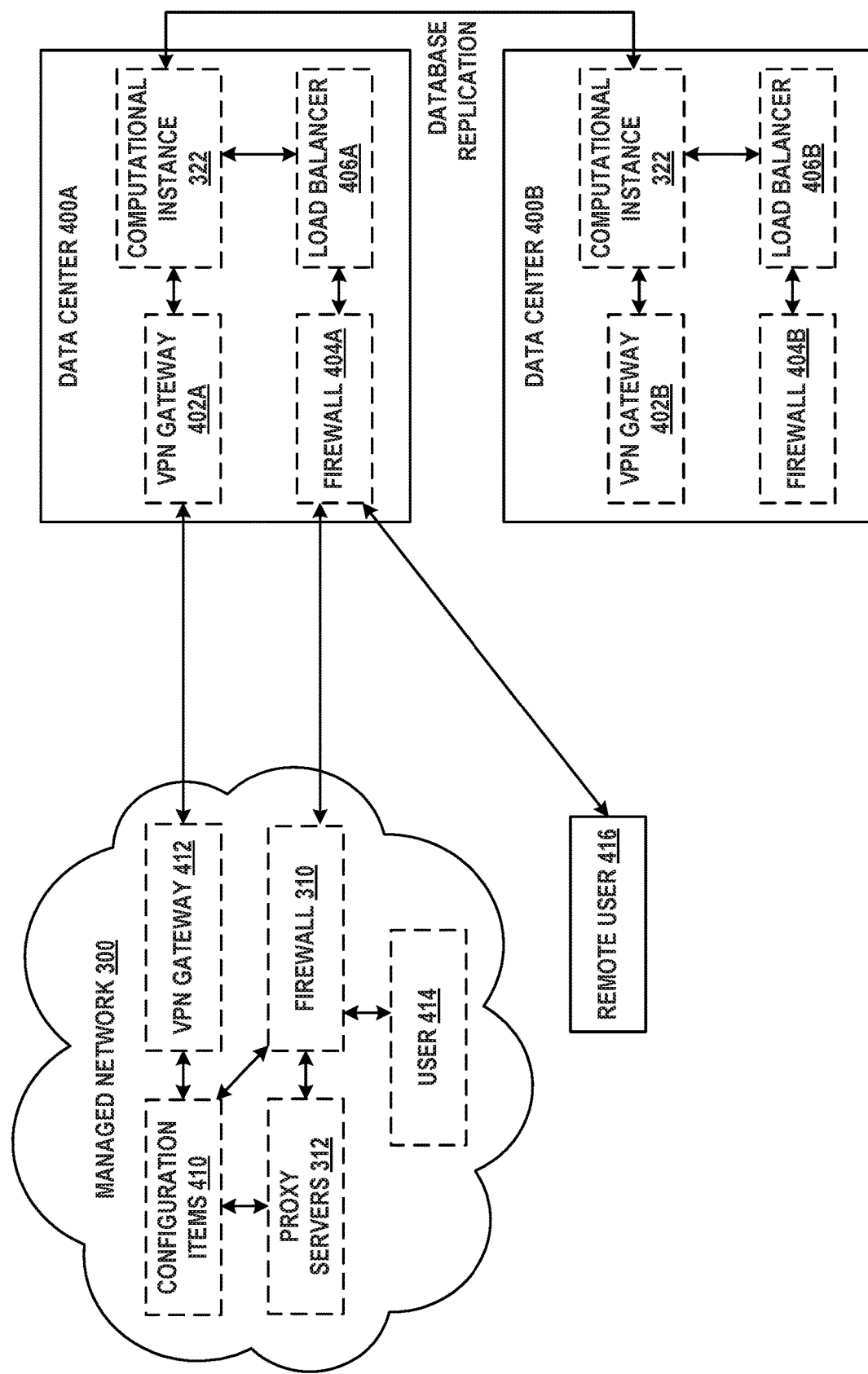
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
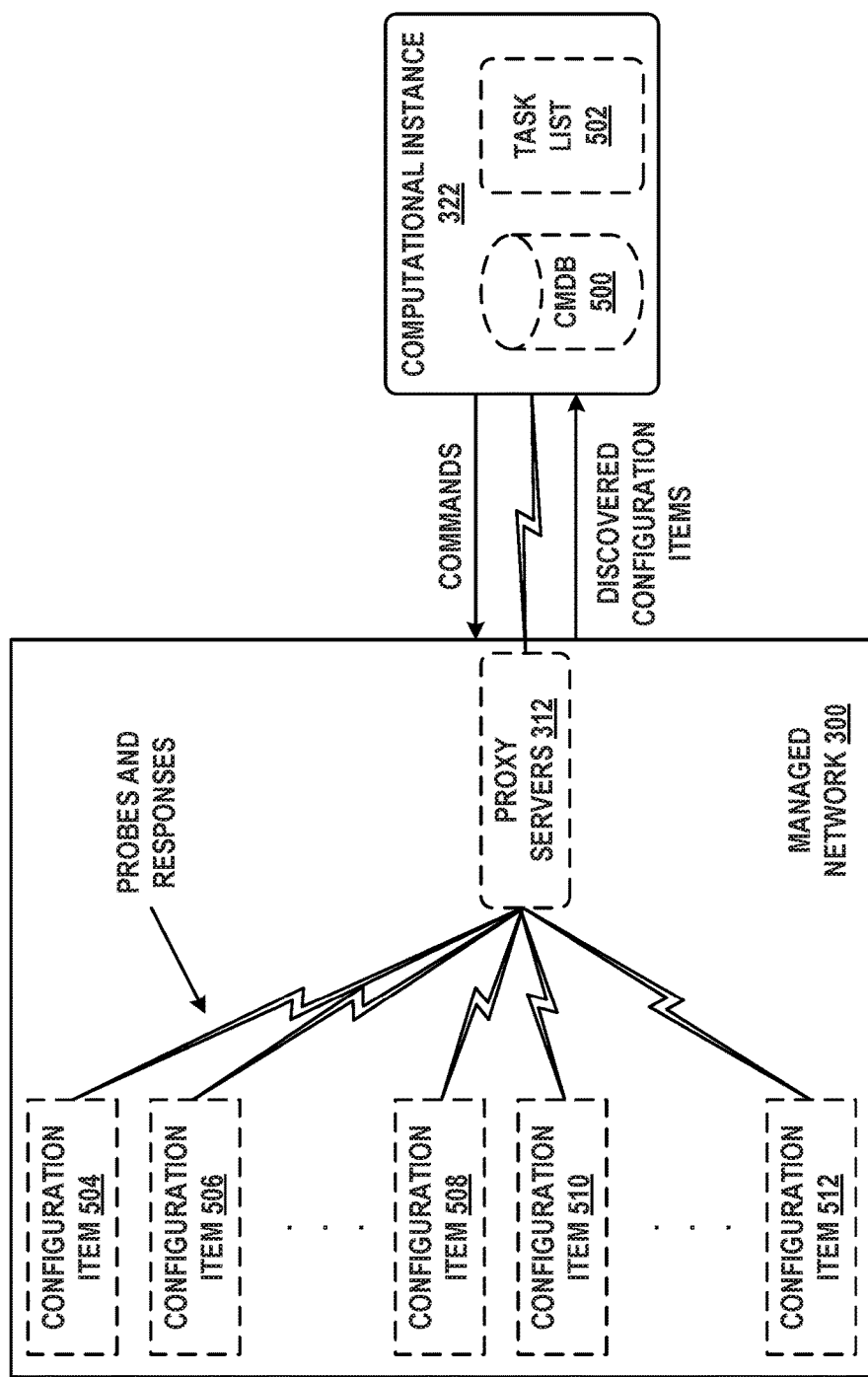
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
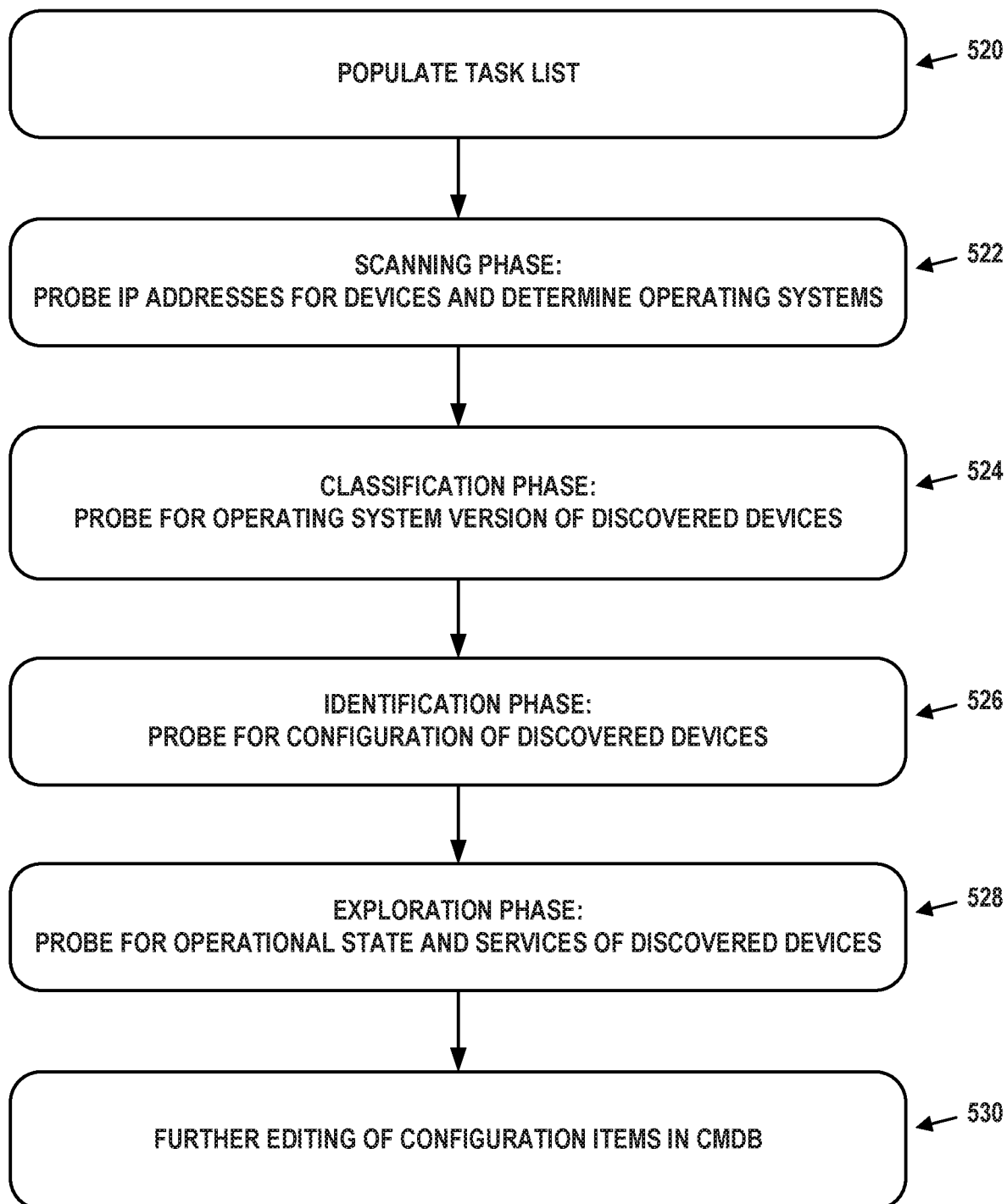
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Service Models

Figure 6:
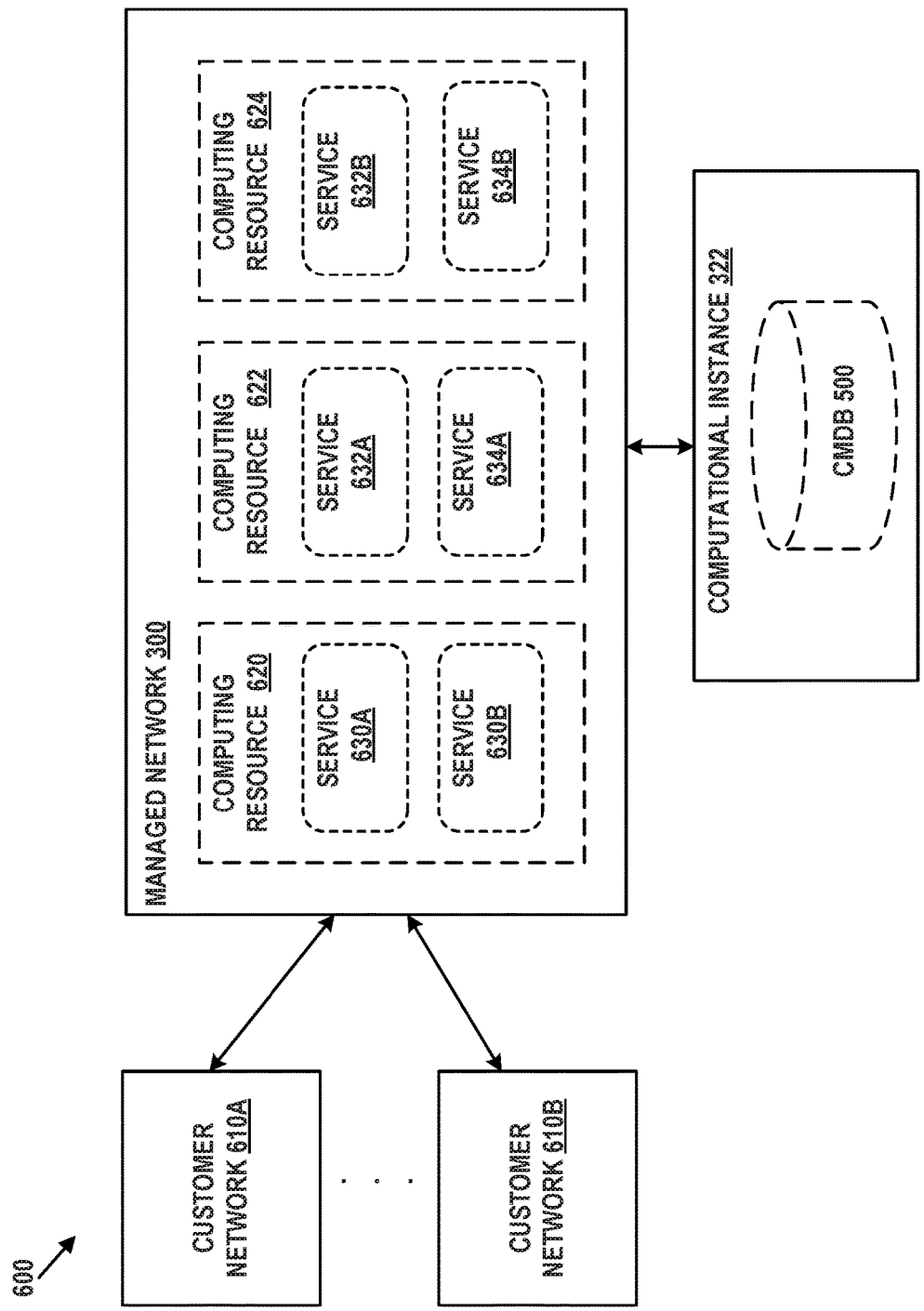
FIG. 6 depicts a network architecture, in accordance with example embodiments.

FIG. 6 depicts network architecture 600, in accordance with example embodiments. This architecture includes four components, managed network 300, computational instance 322, customer network 610A, and customer network 610B. Components of network architecture 600 may be all connected by way of wide area network, for example Internet 350.

Computational instance 322 may be disposed within remote network management platform 320 and dedicated to managed network 300. Computational instance 322 may store discovered configuration items that represent the environment of managed network 300 in CMDB 500.

Customer networks 610A and 610B may be enterprise networks used by customer entities for computing and communication tasks. In examples, customer networks 610A and 610B may be procurers of and/or may be allocated with one or more services offered by managed network 300. In other words, the one or more services may be made available to customer networks 610A and 610B. These services may include analytics, data storage, machine learning software, and so on. For instance, if managed network 300 is associated with a music enterprise, then customer networks 610A and 610B may procure online music streaming services, music file storage services, or other similar services from managed network 300. Notably, customer networks 610A and 610B are used for the purpose of example. In actuality, managed network 300 may provide services to tens, if not hundreds of customer networks. In some examples, customer networks 610A and 610B may also be referred to as end-user networks.

Managed network 300 may be an enterprise network used by an entity for computing and communications tasks, as well as storage of data. In examples, managed network 300 may provide services to customer networks 610A and 610B. In order to support various capabilities as described herein, managed network 300 may include computing resource 620, computing resource 622, and computing resource 624. With the assistance of computing resources 620, 622, and 624, managed network 300 may carry out the operations of services offered to customer networks 610A and 610B. Notably, computing resources 620, 622, and 624 are used solely for the purpose of example. In actuality, managed network 300 may have tens, if not hundreds of computing resources.

Computing resource 620, 622, 624 may be server devices (e.g., a plurality of server clusters such as server cluster 200) that can be used for computational, data storage, communication, and service hosting operations. These servers may be virtualized (i.e., the servers may be virtual machines). In some cases, the computing resources 620, 622, 624 may be physically present on managed network 300. In other cases, the computing resources 620, 622, 624 may be remote server devices hosted by a third-party networks 340 (e.g., AMAZON WEB SERVICES® and/or MICROSOFT® AZURE®).

In some examples, computing resource 620, 622, 624 may be dedicated computing resources. That is, managed network 300 may offer the capabilities of computing resources 620, 622, 624 to a single customer network who gets exclusive access to the physical hardware associated with computing resource 620, 622, 624. Dedicated computing resources may be utilized, for example, for customer networks with highly sensitive information that cannot risk dissemination to others or for customer networks in need of dedicated computing power and/or storage. In other examples, computing resources 620, 622, 624 may be shared computing resources. That is, managed network 300 may offer the capabilities of computing resources 620, 622, 624 to multiple customer networks who then share the physical hardware associated with computing resource 620, 622, 624. Shared computing resource may be utilized, for example, for customer networks with less sensitive information.

As described above, managed network 300 may separately allocate services and computing resources to customer networks 610A and 610B. For example, customer network 610A may be allocated services 630A, 632A, and 634A from managed network 300. Then, customer network 610A may separately be allocated computing resources 620 and 622 from managed network 300. As another example, customer network 610B may be allocated services 630B, 632B, and 634B from managed network 300. Then, customer network 610B may separately be allocated computing resources 620 and 624 from managed network 300. In this way, a computing resource on managed network 300 may be considered distinct from the services operating on the computing resource. Or in other terms, a service is considered distinct from the physical hardware that facilitates the service.

Logically separating services from computing resources may have numerous benefits. As an example, suppose customer network 610A is allocated a data analytics service from managed network 300. Rather than deploying the data analytics service to a single computing resource on managed network 300 (e.g., computing resource 620), customer network 610A could deploy the data analytics service across multiple computing resources on managed network 300 (e.g., computing resource 620 and computing resource 622), thereby forming multiple environments for the service. For instance, computing resource 620 may act as a "test" environment, whereas computing resource 622 may act as a "production" environment. If customer network 610A were to add a new feature to the data analytics service, customer network 610A could make alterations to data analytics service deployed in the test environment. When the alterations are finished (and thoroughly tested for potential errors), customer network 610A could propagate the alterations from test environment of computing resource 620 the production environment of computing resource 622. Advantageously, the new feature can be added to the data analytics service without interrupting the operations of the data analytics service in the production environment.

After allocation, customer networks 610A and 610B may deploy their services to computing resources 620, 622, 624. As used herein, a "deployed service" may be a service offered by managed network 300 that is currently operating on a computing resource. As illustrated in FIG. 6, computing resource 620 contains deployed service 630A and deployed service 630B, computing resource 622 contains deployed service 632A and deployed service 634A, and computing resource 624 contains deployed service 632B and deployed service 634B.

As discussed, the relationships between customer networks 610A and 610B, services 630A, 630B, 632A, 632B, 634A, and 634B, and computing resources 620, 622, and 624 may be complex to administer. To help manage this complexity, remote network management platform 320 may establish a service model to capture the relationships between customer networks, services, and computing resources of managed network 300. During operations, the service model can be populated with a data to establish (i) which customer networks are associated with which services, (ii) which services are associated with which computing resources on managed network 300. In examples, the services model may be provided to managed network 300 via computational instance 322.

Figure 7:
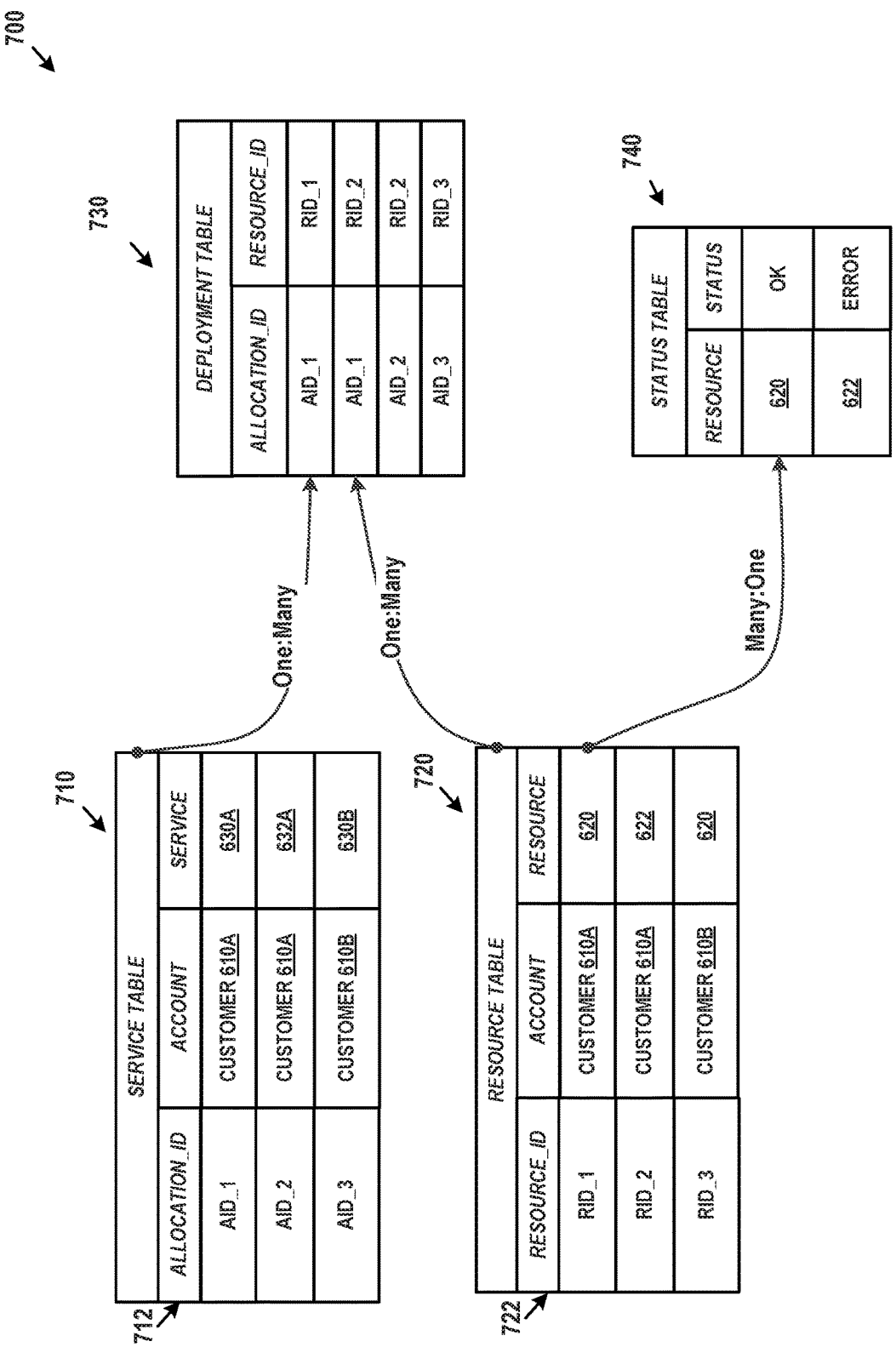
FIG. 7 depicts a service model, in accordance with example embodiments.

FIG. 7 depicts service model 700, in accordance with example embodiments. Service model 700 may include four tables: service table 710, resource table 720, deployment table 730, and status table 740. As a unit, these tables provide the necessary information to capture the relationships between customer networks, services, and computing resources of managed network 300. Services model 700 may take the form of a series of tables on computational instance 322, perhaps in CMDB 500 or another database. In some examples, service model 700 can have more, fewer, and/or different types of tables than indicated in FIG. 7. Moreover, service table 710, resource table 720, deployment table 730, and status table 740 may be abridged for the purposes of clarity. But in practice, these tables may contain more, fewer, and/or different entries.

Service table 710 can include entries that map customer networks to services offered by managed network 300. In particular, each entry in service table 710 may have a unique identifier from allocation identifiers 712 that associates a customer network to a service that the customer network has been allocated. For example, AID_1 establishes that customer network 610A been allocated service 630A, AID_2 establishes that customer network 610A also been allocated service 632A, and AID_3 establishes that customer network 610B been allocated service 630B. In some examples, an administrator from managed network 300 may input, for example through a web page or series of web pages provided by computational instance 322, the information to populate service table 710. In other examples, computational instance 322 may establish a communication channel with a service database located on managed network 300 to obtain the information in a programmatic fashion.

Resource table 720 can include entries that map customer networks to computing resources on managed network 300. In particular, each entry in resource table 720 may have a unique identifier from resource identifiers 722 that associates a customer network to computing resource that the customer network has been allocated. For example, RID_1 establishes that customer network 610A been allocated computing resource 620, RID_2 establishes that customer network 610A also been allocated computing resource 622, and RID_3 establishes that customer network 610B has been allocated computing resource 620. Similarly to service table 710, an administrator from managed network 300 may input, for example through a web page or series of web pages provided by computational instance 322, the information to populate resource table 720. In other examples, computational instance 322 may establish a communication channel with a computing resource database located on managed network 300 to obtain the information in a programmatic fashion.

Deployment table 730 can include entries that relate services to computing resources. In particular, each entry in deployment table 730 associates an allocation identifier to a resource identifier, thereby associating services to the specific computing resource on managed network 300 that carry out the operations of the services. For example, an instance of AID_1 may be operating on RID1, another instance of AID_1 may be operating on RID_2, an instance of AID_2 may be operating on RID_2, and an instance of AID_3 may be operating on RID_3. As previously noted, a service that is operating on a computing resource on managed network 300 is said to be "deployed" onto the computing resource (and hence the name "deployment table"). In some examples, an administrator from managed network 300 may input, for example through a web page or series of web pages provided by computational instance 322, the information to populate deployment table 730. In other examples, computational instance 322 may establish a communication channel with managed network 300 to obtain the information in a programmatic fashion. Deployment table 730 may have a many to one relationship with service table 710 and a many to one relationship with resource table 720.

Status table 740 can include entries that relate computing resources to functional statuses. In particular, each entry in status table 740 associates a computing resource on managed network 300 with a current functional status of that resource. For example, computing resource 620 is associated with an "OK" status, indicating that the functions (e.g., the processors, memory, networking capabilities, and/or physical hardware) of computing resource 620 are satisfactory. As another example, computing resource 622 is associated with an "ERROR" status, indicating that at least one of the functions of computing resource 622 is malfunctioning. Status table 740 may have a many to one relationship with resource table 720.

In some examples, the information to populate status table 740 may be determined by computational instance 322 via discovery. Discovery was discussed above in connection with FIG. 5A-5B. In particular, the herein described computing resources on managed network 300 may take the form of discoverable configuration items. As such, computational instance 322 may be configured to probe each computing resource on managed network 300 and store operational state in CMDB 500.

In some examples, the information to populate status table 740 may be determined by a monitoring system operating on managed network 300, computational instance 322 and/or a third-party network. The monitoring system may be configured to survey the operational state of computing resources on managed network 300 and update status table 740 accordingly.

In unison, service table 710, resource table 720, deployment table 730, and status table 740 can provide computational instance 322 with information to establish (i) which customer networks are associated with which services, (ii) which services are associated with which computing resources on managed network 300, and (iii) in the event a computing resource on managed network 300 fails, which services and/or customer networks are affected by the failure. As an example operation, suppose that computing resource 622 suffers a failure due to an onsite power outage. At first, computational instance 322 may recognize, via status table 740, that computing resource 622 is malfunctioning. From this, computational instance 322 may identify, via resource table 720, that RID_2 is associated with computing resource 622. Subsequently, computational instance 322 may establish, via deployment table 730, that AID_1 and AID_2 are deployed on AID_2. Finally, computational instance 322 may notify, through service table 710, the customer networks associated with AID_1 and AID_2 (e.g., customer networks 610A and 610B) that there is a malfunction occurring on managed network 300.

Notably, service model 700, the configuration of service table 710, resource table 720, deployment table 730, and status table 740, and the relationships between service table 710, resource table 720, deployment table 730, and status table 740 are used for the purpose of example and are not intended to be limiting with respect to the embodiments herein. Other configurations and relationships may exist.

Figure 8:
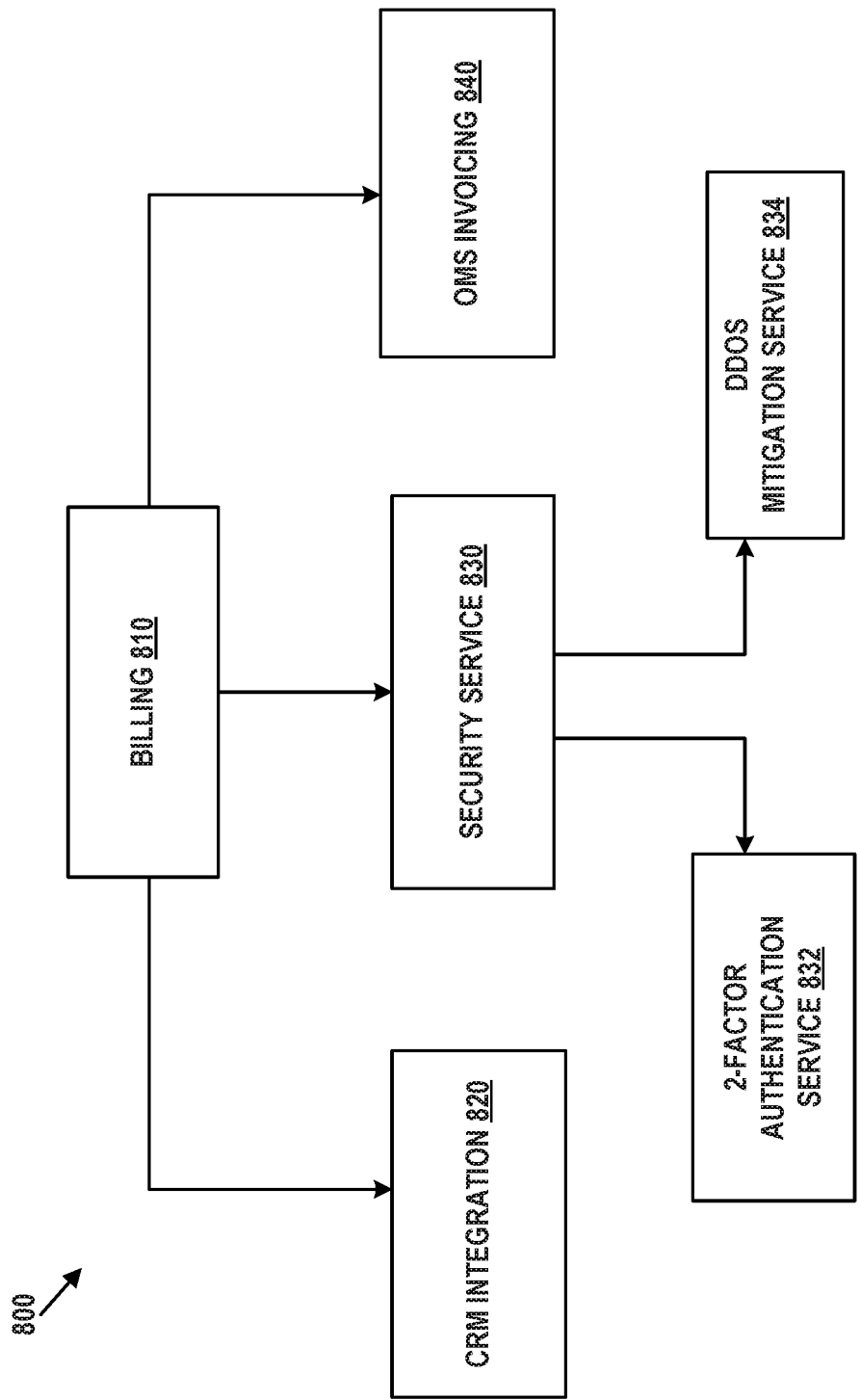
FIG. 8 depicts a service hierarchy diagram, in accordance with example embodiments.

FIG. 8 depicts a service hierarchy diagram 800 for billing service 810, according to example embodiments. Service hierarchy diagram 800 is herein used as a conceptual illustration of a "service solution", or, in more particular terms, a combination of individual service offered by managed network 300 that, in unison, provide an integrated solution for a customer network. Service hierarchy diagram 800 includes customer relationship management (CRM) integration service 820, security service 830, 2-factor authentication service 832, distributed denial of service (DDOS) mitigation service 834, and order management system (OMS) invoicing service 840.

Typically, service solutions offered by managed network 300 have one or more dependencies (represented on service hierarchy diagram 800 as directed arrows). Dependencies may indicate how certain services in a service solution depend on other services during operation. For example, billing service 810 depends on CRM integration service 820, security service 830, and OMS invoicing service 840 during operation. In turn, security service 830 depends on two-factor authentication service 832 and DDOS mitigation service 834 during operation. Further, individual services within service hierarchy diagram 800 may operate on the same or on different computing resources. As one example, CRM integration service 820 and security service 830 may operate on the same computing resource on managed network 300. And as another example, CRM integration service 820 and OMS invoicing service 840 may operate on different computing resources of managed network 300.

In order to sufficiently establish (i) which customer networks are associated with which services, (ii) which services are associated with which computing resources on managed network 300, and (iii) in the event a computing resource of managed network 300 fails, which services and/or customer networks are affected by the failure, computational instance 322 may utilize service hierarchy diagram 800 to identify a chain of services that may be affected during a computing resource failure. More specifically, computational instance 322 may traverse service hierarchy diagram 800 to locate dependent service.

As an example, if 2-factor authentication service 832 is operating on a computing resource that malfunctions, computational instance 322 could traverse service hierarchy diagram 800 and recognize that security service 830 and billing service 810 both have a dependency on 2-factor authentication service 832. As a result, computational instance 322 may identify 2-factor authentication service 832 as a service that is affected the malfunction and may also identify security service 830 and billing service 810 as services that are affected the malfunction, even if security service 830 and billing service 810 are not operating on the same computing resource as 2-factor authentication service 832.

In examples, service hierarchy diagrams, such as service hierarchy diagram 800 can be prepared by users of managed network 300 and may be stored in as a table in CMDB 500 or as one or more tables, for example, in an another database on computational instance 322.

Figure 9:
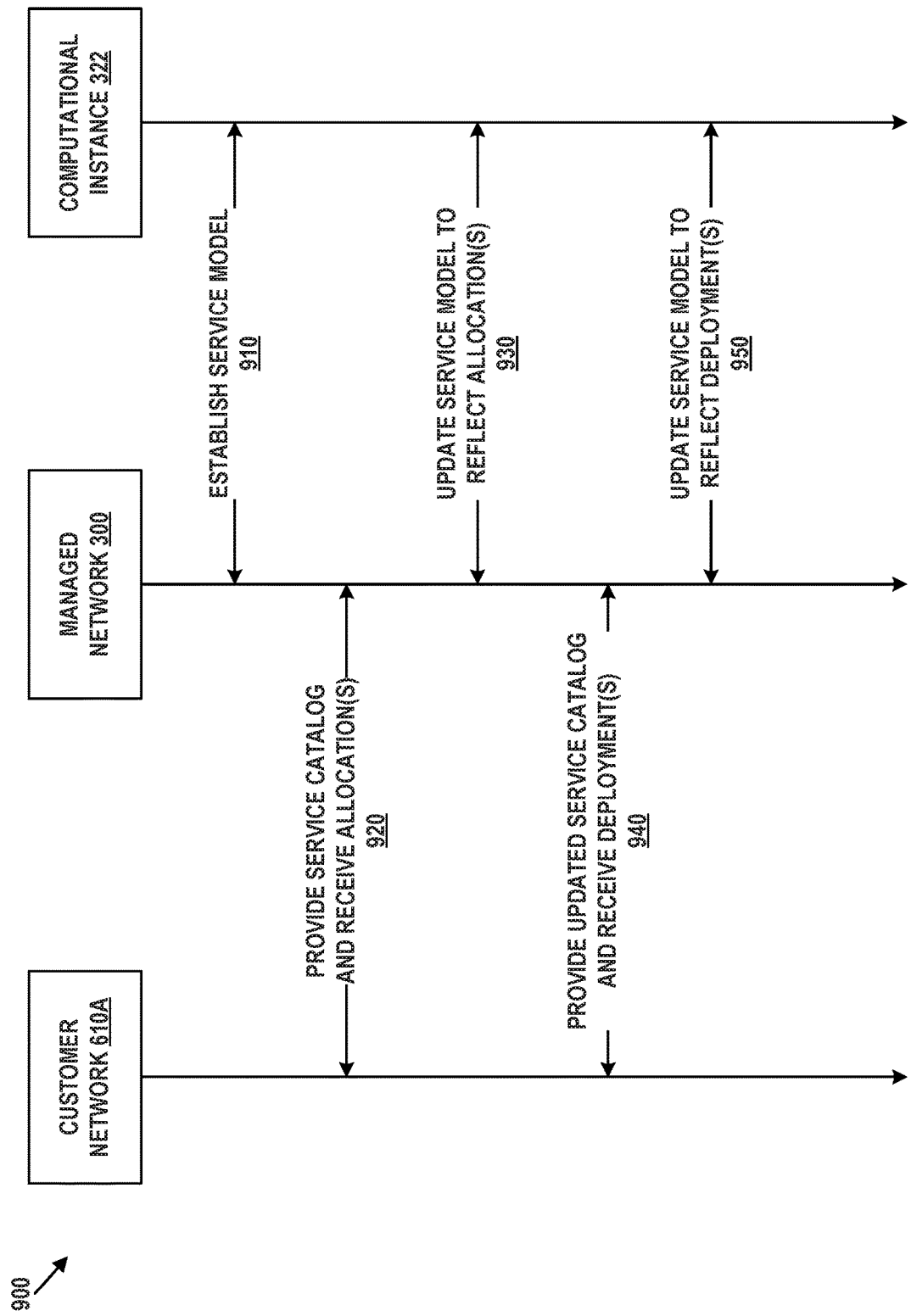
FIG. 9 depicts a message flow diagram for service model configuration, in accordance with example embodiments.

FIG. 9 depicts a message flow diagram for service model configuration procedure 900, in accordance with example embodiments. In particular, service model configuration procedure 900 may represent a specific sequence or series of actions that, when performed, allows computational instance 322 to establish a service model for the services and computing resources utilized by customer network 610A. By way of example, service model configuration procedure 900 may utilize computational instance 322, managed network 300, and customer network 610A during operation. However, additional components, steps, or blocks, may be added to service model configuration procedure 900.

At step 910, managed network 300 may establish a service model on computational instance 322. Establishing a service model may include, for example, populating entries of service table 710, resource table 720, deployment table 730, and/or status table 740. To facilitate step 910, computational instance 322 may prompt a user to enter the appropriate data for a service model. This may be accomplished by way of a web page or series of web pages hosted by computational instance 322 and provided to the user upon request.

At step 920, managed network 300 may provide to customer network 610A a service catalog that delineates some or all available services and computing resource offered by managed network 300. In line with the discussion above, the service catalog may be represented by way of a web page or series of web pages hosted by computational instance 322 and provided to customer network 610A. Upon users from customer network 610A selecting or otherwise choosing at least one service or at least one computing resource from the service catalog, managed network 300 may then allocate the at least one service or the at least one computing resource to customer network 610A.

At step 930, managed network 300 may provide to, computational instance 322, information associated with services and/or computing resources that have been allocated to customer network 610A. Upon receiving the information, computational instance 322 may update service table 710, resource table 720, deployment table 730, and/or status table 740. In particular, if customer network 610A been allocated a service, service table 710 may be updated. And if customer network 610A been allocated a computing resource, resource table 720 may be updated. Subsequently, computational instance 322 may provide managed network 300 a confirmation that the service model is updated to reflect the allocation of step 920.

At step 940, managed network 300 may provide, to customer network 610A, an updated service catalog that delineates some or all of the services available to be deployed to computing resources on managed network 300. In line with the discussion above, the updated service catalog may be represented by way of a web page or series of web pages hosted by computational instance 322 and provided to customer network 610A. Managed network 300 may then receive deployments from customer network 610A. Receiving deployments may involve a user from customer network 610A selecting or otherwise choosing at least one service and at least one computing resource to deploy the service from the service catalog.

At step 950, managed network 300 may provide, to computational instance 322, information associated with services that are deployed to computing resources on managed network 300. As such, step 950 may involve updating service table 710, resource table 720, deployment table 730, and/or status table 740. In particular, if customer network 610A deployed a service, deployment table 730 may be updated. Subsequently, computational instance 322 may provide managed network 300 a confirmation that the service model is updated to reflect the deployment of step 940.

FIG. 10 depicts a message flow diagram for service model diagnosis procedure 1000, in accordance with example embodiments. In particular, service model diagnosis procedure 1000 may represent a specific sequence or series of actions that, when performed, allows computational instance 322 to identify the particular service and/or customer networks affected by a computing resource failure. By way of example, service model diagnosis procedure 1000 may utilize computational instance 322, managed network 300, and customer network 610A during operation. However, additional components, steps, or blocks, may be added to service model configuration procedure 1000.

At step 1010, computational instance 322 may identify malfunctioning computing resources on managed network 300. Identification may be facilitated, for example, by status table 740. As described above, information to populate status table 740 may be obtained, for example, by probing each computing resource on managed network 300 in a discovery process and/or via a monitoring system configured to survey computing resources on managed network 300. At step 1020, computational instance 322 may determine the specific services associated with the malfunctioning computing resources. This determination may include, for example, identifying, using resource table 720, a set of resource identifiers 722 associated with the malfunctioning computing resources, and then identifying, using deployment table 730, a set of allocation identifiers 712 associated with the identified set of resource identifiers 722.

At step 1030, computational instance 322 may determine customer networks associated with the specific services identified in step 1020. This determination may include, for example, identifying, using service table 710, a set of customer networks associated with the identified set of allocation identifiers 712 from step 1020. At step 1040, computational instance 322 may provide managed network 300 with information pertaining to (i) malfunctioning computing resources on managed network 300 (as identified in step 1010) (ii) the services operating on the malfunctioning computing resources (as identified in step 1020), and (iii) the customer networks associated with services that are operating on malfunctioning computing resources (as identified in step 1030). In response, managed network 300 may provide computational instance 322 with instructions for how to proceed. In some examples, these instructions may be stored on computational instance 322. Additionally and/or alternatively, rather than providing computational instance 322 with instructions for how to proceed, the instructions could be carried out directly by managed network 300.

In some examples, instructions may include directives that notify all customer networks with services operating on malfunctioning computing resources. For instance, customer network 610A may have a service deployed on the malfunctioning computing resources identified in step 1010. In another example, instructions may include directives that notify all customer networks associated with malfunctioning computing resources, regardless of whether the customer networks have a services operating on the malfunctioning computing resources. For instance, customer network 610A may have been allocated, but not deployed any service to, the malfunctioning computing resources identified in step 1010.

In a further example, instructions may include directives that notify customer networks as determined by a service hierarchy diagram, such as service hierarchy diagram 800. For instance, upon identifying a malfunctioning computing resource, computational instance 322 may traverse a service hierarchy diagram to determine any service that directly or indirectly depends on a service operating on the malfunctioning computing resource. Accordingly, each dependent service may be notified. In yet another example, instructions may include directives to redeploy services operating on malfunctioning computing resources onto non-malfunctioning computing resources. Other instructions are also possible.

At step 1050, computational instance 322 may alert, based on the specified instructions defined in step 1030, customer network 610A about the malfunctioning computing resource. This alert may be in the form of a text (e.g., short message service (SMS) message), email, phone call, and/or web alert (via a web browser of a user on customer network 610A). Other alerts are also possible.

Additionally, while the disclosure herein is discussed in regard to computing resources on managed network 300 that fail or malfunction, this terminology is not intended to be limiting with respect to the embodiments herein. The features discussed in network architecture 600, service model 700, service hierarchy diagram 800, service model configuration procedure 900, and/or service model diagnosis procedure 1000 may be utilized for computing resources that exhibit any anomalous condition that a customer network should be notified of or is interested in. For example, the embodiments herein may be used if a computing resource reboots, exhibits a high number of incoming requests, and so on.

VI. Example Operations

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

Block 1100 involves determining, by one or more processors disposed within a computational instance of a remote network management platform, that a particular computing resource is exhibiting an anomaly. The computational instance is dedicated to a managed network and includes persistent storage. The persistent storage contains: (i) a first set of mappings between end-user networks, services respectively available to the end-user networks by way of the managed network, and respective allocation identifiers, (ii) a second set of mappings between the end-user networks, computing resources respectively allocated to the end-user networks by the managed network, and respective resource identifiers, and (iii) a third set of mappings between the respective allocation identifiers and the respective resource identifiers, where each mapping of the third set of mappings indicates that one of the services associated with one of the respective allocation identifiers is deployed upon one of the computing resources associated with one of the respective resource identifiers. The particular computing resource is one of the computing resources.

Block 1110 involves determining, by the one or more processors and based on the second set of mappings, a particular resource identifier associated with the particular computing resource.

Block 1120 involves determining, by the one or more processors and based on the third set of mappings, a particular allocation identifier based on the particular resource identifier.

Block 1130 involves determining, by the one or more processors and based on the first set of mappings, a particular end-user network associated with the particular allocation identifier.

Block 1140 involves providing, by the one or more processors and to the managed network, an indication that the particular end-user network is potentially impacted by the anomaly.

Some embodiments involve determining, based on the first set of mappings, a particular service associated with the particular allocation identifier, where the indication specifies the particular computing resource and the particular service.

In some embodiments, the computing resources are shared computing resources, at least some of which can be allocated to a plurality of end-user networks.

In some embodiments, determining that the particular computing resource is exhibiting the anomaly involves receiving, from a monitoring system disposed on the managed network, status information regarding the particular computing resource.

Some embodiments involve providing, to the particular end-user network, a further indication that the particular end-user network is potentially impacted by the anomaly.

In some embodiments, the persistent storage further contains a representation of a service hierarchy diagram. The service hierarchy diagram contains dependency relationships between the services available to the end-user networks by way of the managed network. The embodiments may also involve determining, based on the first set of mappings, a particular service associated with the particular allocation identifier, determining, based on the service hierarchy diagram, a set of services that depend on the particular service, and providing, to the managed network, a representation of the set of services that depend on the particular service.

Some embodiments involve: after the managed network makes a new service available to the particular end-user network, receiving, from the managed network, information associated with the new service, and updating, based on the information, the first set of mappings to include a new mapping between the particular end-user network, the new service, and a new allocation identifier.

Some embodiments involve: after the managed network allocates a new computing resource to the particular end-user network, receiving, from the managed network, information associated with the new computing resource, and updating, based on the information, the second set of mappings to include a new mapping between the particular end-user network, the new computing resource, and a new resource identifier.

Some embodiments involve: after the managed network receives an indication that the particular end-user network performed a deployment of a new service onto a new computing resource, receiving, from the managed network, information related to the deployment, and updating, based on the information, the third set of mappings to include a new mapping between an allocation identifier associated with the new service and a resource identifier associated with the new computing resource.

In some embodiments, a system may include means for determining, by one or more processors disposed within a computational instance of a remote network management platform, that a particular computing resource is exhibiting an anomaly. The computational instance is dedicated to a managed network and includes persistent storage. The persistent storage contains: (i) a first set of mappings between end-user networks, services respectively available to the end-user networks by way of the managed network, and respective allocation identifiers, (ii) a second set of mappings between the end-user networks, computing resources respectively allocated to the end-user networks by the managed network, and respective resource identifiers, and (iii) a third set of mappings between the respective allocation identifiers and the respective resource identifiers, wherein each mapping of the third set of mappings indicates that one of the services associated with one of the respective allocation identifiers is deployed upon one of the computing resources associated with one of the respective resource identifiers. The particular computing resource is one of the computing resources. The system may also include means for determining, based on the second set of mappings, a particular resource identifier associated with the particular computing resource. The system may also include means for determining, based on the third set of mappings, a particular allocation identifier based on the particular resource identifier. The system may also include means for determining, based on the first set of mappings, a particular end-user network associated with the particular allocation identifier. The system may also include means for providing, to the managed network, an indication that the particular end-user network is potentially impacted by the anomaly.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
  persistent storage disposed within a computational instance of a remote network management platform, wherein the computational instance is dedicated to a managed network, wherein the persistent storage contains: (i) a first set of mappings between respective end-user networks, respective services available to the respective end-user networks by way of the managed network, and respective allocation identifiers, (ii) a second set of mappings between the respective end-user networks, respective computing resources allocated to the respective end-user networks by the managed network, and respective resource identifiers, and (iii) a third set of mappings between the respective allocation identifiers and the respective resource identifiers, wherein each mapping of the third set of mappings indicates that one of the respective services associated with one of the respective allocation identifiers is deployed upon one of the respective computing resources associated with one of the respective resource identifiers; and
  one or more processors disposed within the computational instance and configured to perform operations comprising:
    determining that a particular computing resource of the respective computing resources is exhibiting an anomaly;
    determining, based on the second set of mappings, a particular resource identifier of the respective resource identifiers associated with the particular computing resource;
    determining, based on the third set of mappings, a particular allocation identifier of the respective allocation identifiers based on the particular resource identifier;
    determining, based on the first set of mappings, a particular end-user network of the respective end-user networks associated with the particular allocation identifier; and
    providing, to the managed network, an indication that the particular end-user network is potentially impacted by the anomaly.

2. The computing system of claim 1, wherein the operations comprise:
  determining, based on the first set of mappings, a particular service of the respective services associated with the particular allocation identifier, wherein the indication specifies the particular computing resource and the particular service.

3. The computing system of claim 1, wherein the respective computing resources are shared computing resources, at least some of which can be allocated to a plurality of end-user networks that include the respective end-user networks.

4. The computing system of claim 1, wherein determining that the particular computing resource is exhibiting the anomaly comprises receiving, from a monitoring system disposed on the managed network, status information regarding the particular computing resource.

5. The computing system of claim 1, wherein the operations comprise:
  providing, to the particular end-user network, an additional indication that the particular end-user network is potentially impacted by the anomaly.

6. The computing system of claim 1, wherein the persistent storage contains a representation of a service hierarchy diagram, wherein the service hierarchy diagram contains respective dependency relationships between the respective services available to the respective end-user networks by way of the managed network, and wherein the operations comprise:
  determining, based on the first set of mappings, a particular service of the respective services associated with the particular allocation identifier,
  determining, based on the service hierarchy diagram, a set of the respective services that depend on the particular service, and
  providing, to the managed network, a representation of the set of the respective services that depend on the particular service.

7. The computing system of claim 1, wherein the operations comprise:
- after the managed network makes a new service available to the particular end-user network, receiving, from the managed network, information associated with the new service, and
- updating, based on the information, the first set of mappings to include a new mapping between the particular end-user network, the new service, and a new allocation identifier.

8. The computing system of claim 1, wherein the operations comprise:
- after the managed network allocates a new computing resource to the particular end-user network, receiving, from the managed network, information associated with the new computing resource, and
- updating, based on the information, the second set of mappings to include a new mapping between the particular end-user network, the new computing resource, and a new resource identifier.

9. The computing system of claim 1, wherein the operations comprise:
- after the managed network receives an indication that the particular end-user network has performed a deployment of a new service onto a new computing resource, receiving, from the managed network, information related to the deployment, and
- updating, based on the information, the third set of mappings to include a new mapping between a new allocation identifier associated with the new service and a new resource identifier associated with the new computing resource.

10. A computer-implemented method comprising:
- determining, by one or more processors disposed within a computational instance of a remote network management platform, that a particular computing resource is exhibiting an anomaly, wherein the computational instance is dedicated to a managed network, wherein the computational instance includes persistent storage, wherein the persistent storage contains: (i) a first set of mappings between respective end-user networks, respective services available to the respective end-user networks by way of the managed network, and respective allocation identifiers, (ii) a second set of mappings between the respective end-user networks, respective computing resources allocated to the respective end-user networks by the managed network, and respective resource identifiers, and (iii) a third set of mappings between the respective allocation identifiers and the respective resource identifiers, wherein each mapping of the third set of mappings indicates that one of the respective services associated with one of the respective allocation identifiers is deployed upon one of the respective computing resources associated with one of the respective resource identifiers, and wherein the particular computing resource is one of the respective computing resources;
- determining, by the one or more processors and based on the second set of mappings, a particular resource identifier of the respective resource identifiers associated with the particular computing resource;
- determining, by the one or more processors and based on the third set of mappings, a particular allocation identifier of the respective allocation identifiers based on the particular resource identifier;
- determining, by the one or more processors and based on the first set of mappings, a particular end-user network of the respective end-user networks associated with the particular allocation identifier; and
- providing, by the one or more processors and to the managed network, an indication that the particular end-user network is potentially impacted by the anomaly.

11. The computer-implemented method of claim 10, further comprising:
- determining, based on the first set of mappings, a particular service associated with the particular allocation identifier, wherein the indication specifies the particular computing resource and the particular service.

12. The computer-implemented method of claim 10, wherein the respective computing resources are shared computing resources, at least some of which can be allocated to a plurality of end-user networks that includes the respective end-user networks.

13. The computer-implemented method of claim 10, wherein determining that the particular computing resource is exhibiting the anomaly comprises receiving, from a monitoring system disposed on the managed network, status information regarding the particular computing resource.

14. The computer-implemented method of claim 10, comprising:
- providing, to the particular end-user network, an additional indication that the particular end-user network is potentially impacted by the anomaly.

15. The computer-implemented method of claim 10, wherein the persistent storage contains a representation of a service hierarchy diagram, wherein the service hierarchy diagram contains respective dependency relationships between the respective services available to the respective end-user networks by way of the managed network, and wherein the computer-implemented method comprises:
- determining, based on the first set of mappings, a particular service of the respective services associated with the particular allocation identifier,
- determining, based on the service hierarchy diagram, a set of the respective services that depend on the particular service, and
- providing, to the managed network, a representation of the set of the respective services that depend on the particular service.

16. The computer-implemented method of claim 10, comprising:
- after the managed network makes a new service available to the particular end-user network, receiving, from the managed network, information associated with the new service, and
- updating, based on the information, the first set of mappings to include a new mapping between the particular end-user network, the new service, and a new allocation identifier.

17. The computer-implemented method of claim 10, comprising:
- after the managed network allocates a new computing resource to the particular end-user network, receiving, from the managed network, information associated with the new computing resource, and
- updating, based on the information, the second set of mappings to include a new mapping between the particular end-user network, the new computing resource, and a new resource identifier.

18. The computer-implemented method of claim 10, comprising:
- after the managed network receives an indication that the particular end-user network has performed a deployment of a new service onto a new computing resource,
receiving, from the managed network, information related to the deployment, and updating, based on the information, the third set of mappings to include a new mapping between a new allocation identifier associated with the new service and a new resource identifier associated with the new computing resource.

19. An article of manufacture including a non-transitory computer-readable medium, having stored thereon program instructions that, upon execution by one or more processors disposed within a computational instance of a remote network management platform, cause computational instance to perform operations comprising:

determining that a particular computing resource is exhibiting an anomaly, wherein the computational instance is dedicated to a managed network, wherein the computational instance includes persistent storage, wherein the persistent storage contains: (i) a first set of mappings between respective end-user networks, respective services available to the respective end-user networks by way of the managed network, and respective allocation identifiers, (ii) a second set of mappings between the respective end-user networks, respective computing resources allocated to the respective end-user networks by the managed network, and respective resource identifiers, and (iii) a third set of mappings between the respective allocation identifiers and the respective resource identifiers, wherein each mapping of the third set of mappings indicates that one of the respective services associated with one of the respective allocation identifiers is deployed upon one of the respective computing resources associated with one of the respective resource identifiers, and wherein the particular computing resource is one of the respective computing resources;

determining, based on the second set of mappings, a particular resource identifier of the respective resource identifiers associated with the particular computing resource;

determining, based on the third set of mappings, a particular allocation identifier of the respective allocation identifiers based on the particular resource identifier;

determining, based on the first set of mappings, a particular end-user network of the respective end-user networks associated with the particular allocation identifier; and providing, to the managed network, an indication that the particular end-user network is potentially impacted by the anomaly.

20. The article of manufacture of claim 19, wherein the operations comprise:

providing, to the particular end-user network, an additional indication that the particular end-user network is potentially impacted by the anomaly.

* * * * *